United States Patent

[11] 3,526,167

[72] Inventor Francisco Escobedo
  Inglewood, California
[21] Appl. No. 731,494
[22] Filed May 23, 1968
[45] Patented Sept. 1, 1970
[73] Assignee Fresco Industries Inc.,
  Gardena, California
  a corporation of California

[54] MULTI-PURPOSE MILLING HEADS
  14 Claims, 24 Drawing Figs.
[52] U.S. Cl. .................................. 90/11.58,
  90/11.4, 90/16, 74/384
[51] Int. Cl. ..................................... B23c 3/28,
  B23c 3/32, B23c 1/12
[50] Field of Search ........................... 74/384,
  396; 90/11.58, 11.4, 11.66, 11, 16

[56] References Cited
UNITED STATES PATENTS
| | | | |
|---|---|---|---|
| 2,451,497 | 10/1948 | Kratchman | 90/11.58 |
| 2,742,796 | 4/1956 | Zorich | 74/384 |
| 2,875,629 | 3/1959 | Poorman | 74/384 |

Primary Examiner—Gil Weidenfeld
Attorney—Howard L. Johnson

ABSTRACT: Detachable cutter for coupling to spindle such as that of milling machine. By means of gear train of three gears, pivoted on the intermediate gear like a scissors, head holds adjacent ends of its contained drive shaft segments selectively in axial alignment or offset. Shift of shaft positions can be made without stopping drive, by means of slide block which journals two of trio of gears. Calibrated adjustment screw with lock means move slide block and enable return of the continually parallel shafts to any previous offset positions. Interchangeable pairs of threaded guide cylinders permit axial displacement of gear train housing and its dependent cutter shaft along spiral path determined by pitch of guide threads; consequent thread pattern is thus transferred to bore of workpiece by the cutter. Alternate guide cylinders, unthreaded, prevent axial displacement and maintain cutter at constant level so as to form internal, external and bottom grooves in bores, or to level the surface of, or to bevel a workpiece, etc. Head also usable for profiling or scalloping, forming external as well as internal threads, etc. Adapter unit also provided to further extend radial positioning of cutter for arcuate cuts. Pivoted gear train assembly also usable in other drive shaft connections.

Patented Sept. 1, 1970
3,526,167
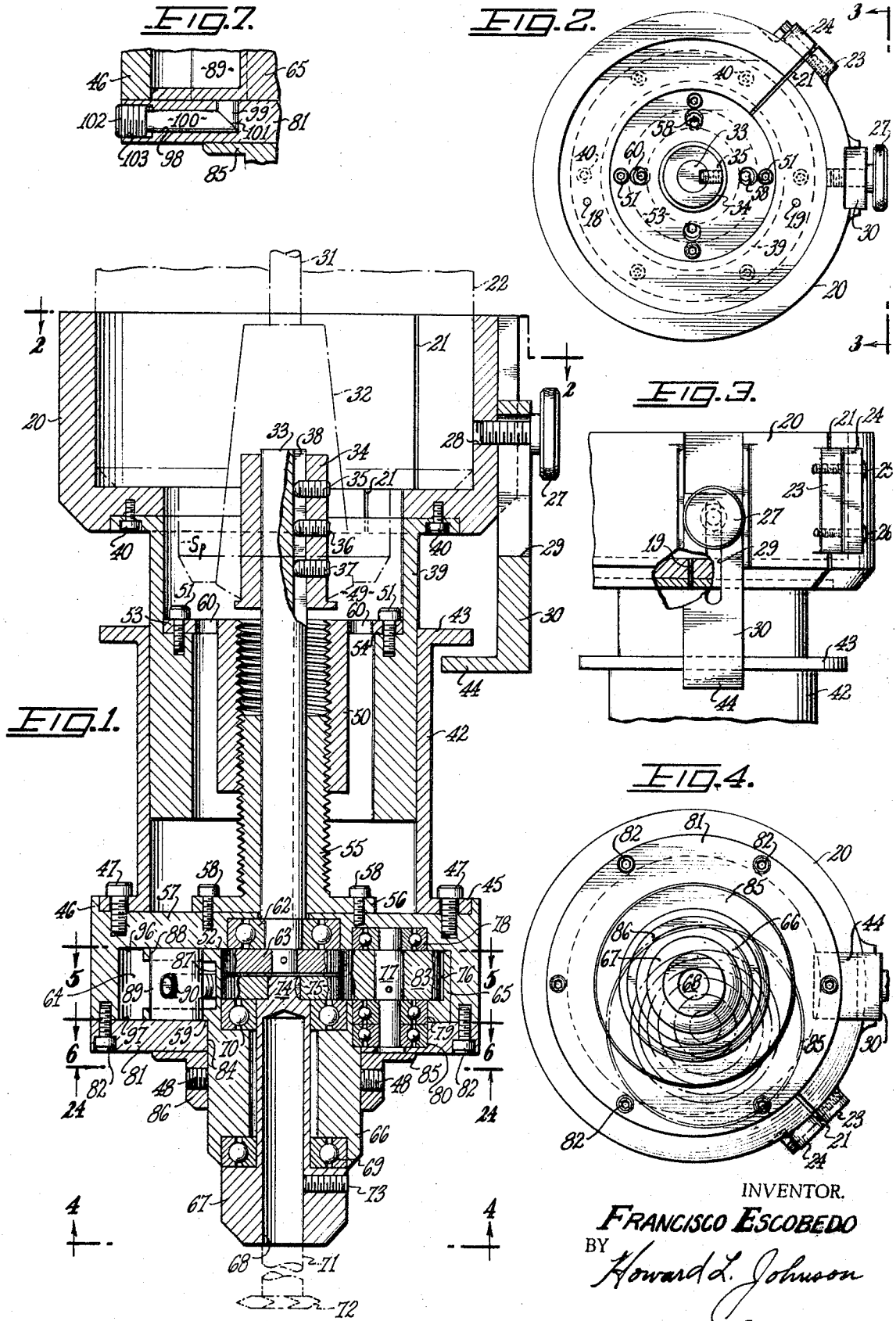
INVENTOR.
FRANCISCO ESCOBEDO
BY Howard L. Johnson
ATTORNEY

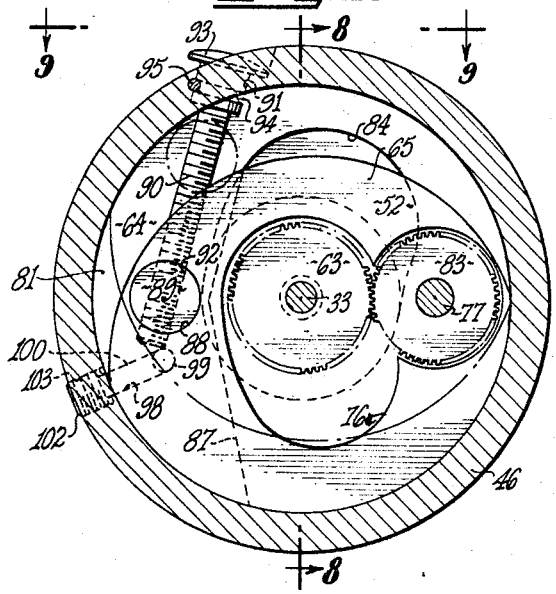

Patented Sept. 1, 1970 3,526,167
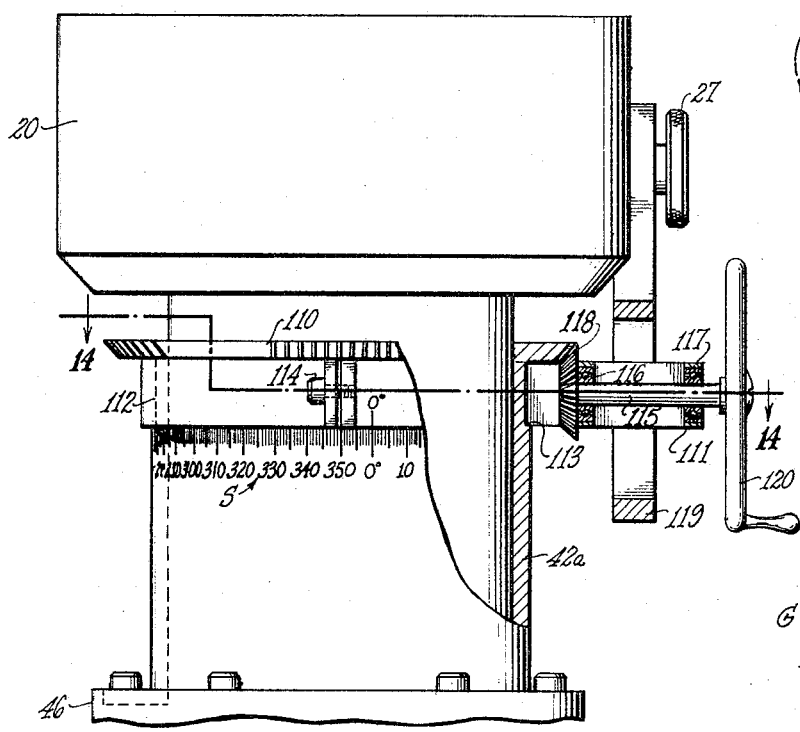
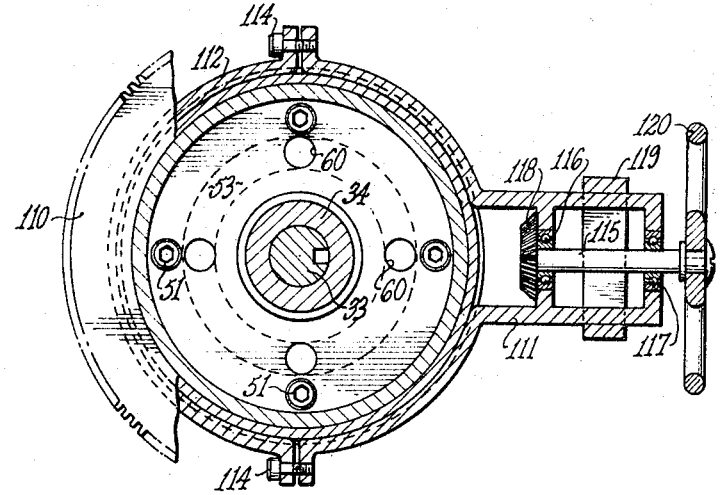
INVENTOR.
FRANCISCO ESCOBEDO
BY Howard L. Johnson
ATTORNEY Patented Sept. 1, 1970
3,526,167
Sheet 4 of 4
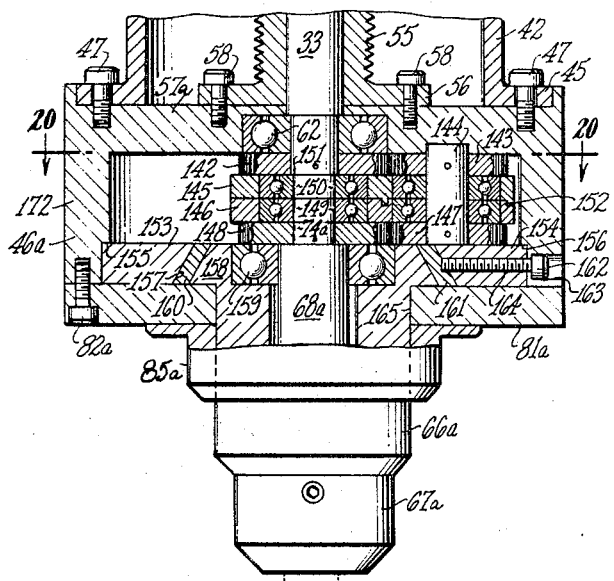
Fig.19.
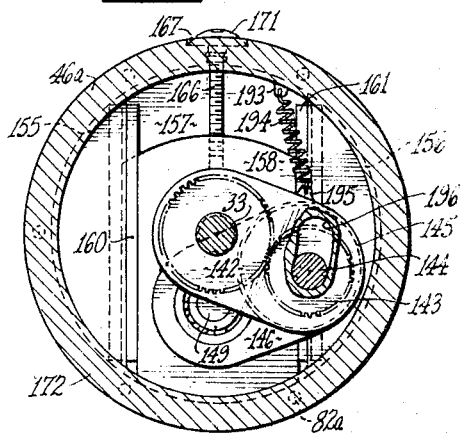
Fig.21.
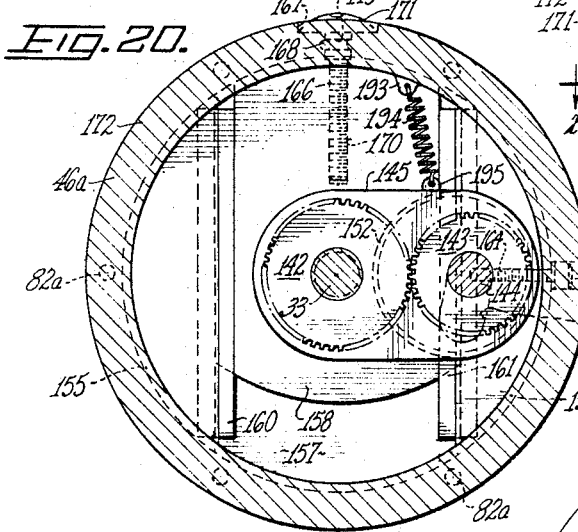
Fig.20.
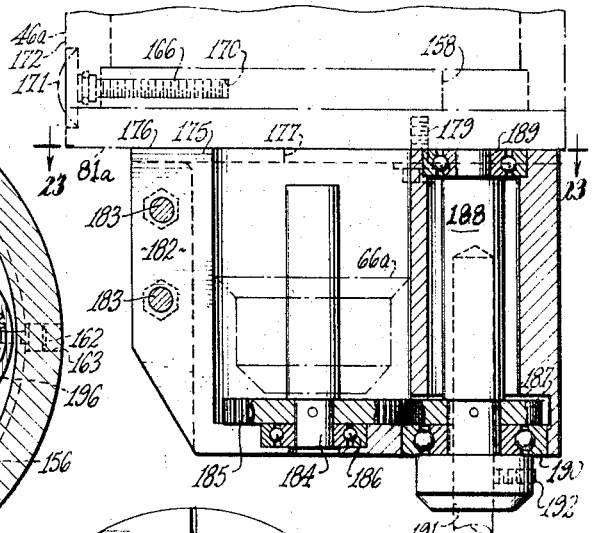
Fig.22.
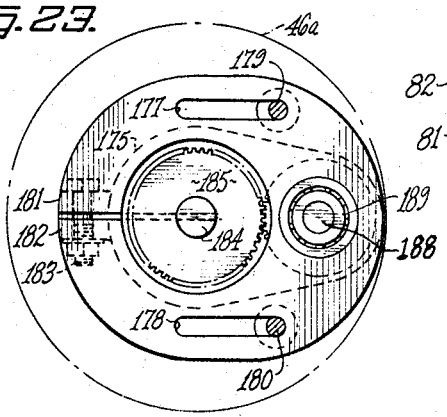
Fig.23.
Fig.24.
INVENTOR.
FRANCISCO ESCOBEDO
BY
ATTORNEY

MULTI-PURPOSE MILLING HEADS

BACKGROUND OF THE INVENTION

This invention relates to a gear-train assembly and to its use for example in a versatile adapter head which can be readily coupled to the drive shaft or spindle of a milling machine or other rotary shaft so as to drive a rotary tool such as a cutter, in a predetermined axial path (i.e., spirally), or alternately without axial movement (either with or without circumferential movement of the rotary tool relative to the axis). The present assembly can position a driven shaft either concentric or eccentric to a drive shaft, while maintaining both shafts mutually parallel, and permitting such shifts to be made at will and in predetermined amounts without stopping the drive. By means of a calibrated adjustment screw, any such off-center position can readily be returned to again and again. Such adjustment is effected by means of a transversely movable (i.e., in a diametric plane) socketed shift element or slide block which in one form is eccentrically pivoted within an annular housing of the adapter head.

A gear train consisting of a trio of cylindrical gears is retained in a cavity of the slide block, which gear train is pivoted on the axis of the intermediate gear, and movement of the block serves to shift the third gear to and from axial alignment with the first gear, while all three continue to remain in driving engagement. Typically, the first and third gear are each one-half of the axial height of the intermediate gear so as (when concentrically located) to form a column or stack parallel and adjacent to that represented by the intermediate gear. Lateral displacement of the third gear from such "stacked" position thus offsets its carried shaft and the cutter continues to be rotated concentrically on its own shaft but the latter is then offset or eccentric to the axis of the initial drive shaft, which drive shaft is driving the first gear of the train. Thus the first and third gears continue to turn in the same direction, that is, clockwise or counterclockwise as the case may be. In another form, with a linearly reciprocating (wedge-shaped) slide block, two of the three gears change positions simultaneously but maintain the same driving relation as before.

Such drive shaft coupling unit can of course be used in various connections but in the herein exemplified usage it finds particular utility in such cutting head with a rotary cutter which is employed in forming internal and external threads on or in a cylindrical workpiece (i.e., in a bore or around a turret). For this purpose there is provided interchangeable pairs of guide cylinders or inserts which are detachably mounted in telescoping tubes which separate a fixed housing from a movable housing of the adapter head, and are threadedly engaged with each other by threads of the desired pitch; such pitch or thread-pattern is thus transferred to the workpiece by action of the cutter. This eliminates the use of conventional taps for threading a bore. That is, the members of a pair of threaded inserts unscrew and screw together for a predetermined axial distance (while the cutter rotates independently) so as to move the gear housing and its dependently carried cutter in the spiral path which is set by the threads of the inserts. Such spiral movement need not be constant and can be stopped (temporarily or permanently) at any point, or its direction can be reversed while the cutter continues to rotate. To accommodate such longitudinal movement, the drive shaft of the head is formed with an axially extensible portion, and limit means are also provided for such movement.

BRIEF SUMMARY OF THE INVENTION

In its illustrated embodiment, the invention provides a detachable head having an upper housing for stationary attachment to the housing of a milling machine, so as to couple the spindle of the latter to a dependent drive stem within the head by keyed coupling means permitting axial descent and ascent of the dependent drive stem as it carries a cutting tool. The fixed upper housing is connected to a selectively (manually) rotatable lower housing of the head by means of a pair of telescopic tubes which are interchangeably inserted, selected pairs of guide cylinders which may have mutually engaging threads of desired pitch or alternatively may be keyed for only annular movement; the path of relative movement of the two members of a pair of guide cylinders is the same movement which is followed by the lower housing relative to the upper housing, i.e., spiral or annular.

From its spindle connection, the drive stem extends centrally downward through the guide cylinders and the surrounding telescopic tubes to a terminal drive gear within the lower housing, which gear forms part of a gear train which includes an intermediate gear and a driven gear, the latter carried by a dependently projecting driven shaft which distally may carry such cutting tool as a rotary cutter for cutting threads in a workpiece; or a milling head for making straight, arcuate, or annular cuts in sheet stock, or a key cutter for forming grooves in a bore, or a chamfer cutter, or a flycutter, etc.

In one form, the three-unit gear train is held together with a socketed slide block by a transverse pair of parallel links, one connecting the drive gear with the intermediate gear, the other connecting the intermediate gear with the driven gear; the last two gears can be jointly moved relative to the first gear so as to position the driven shaft offset to the drive shaft (and to the milling spindle-like) opening and closing the blades of a pair of scissors. In another form, only the driven gear of the gear train is shiftable for this purpose, as before being pivoted on the intermediate gear. In either case, drive connection through the gear train is continuous through such shifts.

The driven gear and intermediate gear are journalled in a slide block which is selectively movable in a guideway of the lower housing by means of a positioning screw, and is then held at calibrated and reproducible position by lock means. Adapters are also provided for attachment to the bottom of each construction, which by laterally-placed gears, further offsets the driven shaft and its cutting element so as, for example, to follow an arc or circle of greater radius, which is based on a center along the axis of the milling spindle.

DESCRIPTION OF THE DRAWINGS

FIG. 1 is an axial sectional view of my milling head, with some portions broken away and some parts shown in elevation.

FIG. 2 is a top plan view as seen along the line 2—2 of FIG. 1.

FIG. 3 is an elevational view as seen along the line 3—3 of FIG. 2, with a portion broken away to show a lock pin.

FIG. 4 is a bottom plan view as seen along the line 4—4 in FIG. 1.

FIG. 5 is a transverse sectional view taken along the line 5—5 of FIG. 1, and particularly showing the adjusting screw and slide block.

FIG. 6 is a transverse sectional view taken along the line 6—6 of FIG. 1, showing the locking elements in broken lines.

FIG. 7 is a detail view through the gear housing, taken along the line 7—7 of FIG. 5, and showing the locking elements in elevation.

FIG. 8 is an axial section through the gear housing taken along the line 8—8 of FIG. 5, with parts in elevation.

FIG. 9 is an elevational view of a portion of the gear housing, showing the head of the adjusting screw as seen along the line 9—9 of FIG. 5.

FIG. 10 is an axial section taken through the drive stem (seen in elevation) and particularly showing (in place of the threaded guide cylinders of FIG. 1) a pair of unthreaded cylinders which prevent axial separation or spiral movement of the drive shaft and driven shaft.

FIG. 11 is a top plan view of a workpiece, showing a cutter used with the threaded guide cylinders of FIG. 1 to form interrupted threads in two adjacent bores of a workpiece.

FIG. 12 is a transverse sectional view taken through the workpiece of FIG. 11 along the line 12—12.

FIG. 13 is an elevational view of the upper portion of the milling head, partly broken away or in section, which head has been modified by incorporation of a hand-crank for rotationally positioning the driven end.

FIG. 14 is a transverse sectional view taken along the line 14—14 of FIG. 13.

FIG. 15 is a transverse section through an annularly drilled and centrally threaded workpiece, showing how two different groove-cutting tools may then be used with the present head, respectively to cut a side groove and to mill a bottom channel.

FIGS. 16 and 17 are, respectively, top and vertical sectional views of a workpiece showing how a fly cutter can be used with the present head to shave or level the top surface of a workpiece.

FIG. 18 is a plan view of a head gasket for a single cylinder of an engine, which gasket can be formed in such configuration from sheet metal by the present milling head.

FIG. 19 is an axial sectional view through the gear housing, with parts in elevation, and particularly showing a modified construction of shift block for the gear train mounted thereon.

FIG. 20 is a transverse sectional view taken along the line 20—20 of FIG. 19, with the gears in position to transmit rotary motion to a concentrically disposed shaft.

FIG. 21 is a similar view with the gears in position to drive an offset shaft.

FIG. 22 is an axial sectional view of an adapter unit shown attached to the head of FIG. 19.

FIG. 23 is a transverse section taken along the line 23—23 of FIG. 22.

FIG. 24 is a similar view along line 24—24 of FIG. 1, of an adapter attached to the head of FIG. 1 (with the cover plate 85 removed).

DESCRIPTION OF PREFERRED EMBODIMENT

As seen particularly in FIGS. 1—3, the upper housing 20 of my milling head is formed as a tube or collar, longitudinally split at 21, and in mounting has its adjacent side edges drawn together and clamped tight about the quill 22 of a milling machine (not shown) by means of a pair of radially outwardly projecting shoulders 23, 24, which are selectively held together by pull screws 25, 26. One half of the housing tube 20 is permanently fixed to the underbody by lock pins 18, 19 (FIGS. 2, 3). Along one side of the housing, a thumb screw 27 is received in a tapped aperture 28 after passing through a longitudinal slot 29 of an L-shaped stop member 30 which is thus adjustably positioned and held against the outer face of the housing at any desired position along the length of the slot, for a purpose detailed below.

Concentrically centered within the housing 20 and quill 22, the conventional draw bar 31 and collet 32 of the milling machine spindle Sp are coupled to an axially movable stem or drive shaft 33 of the adapter by means of a sleeve 34 which carries a row of hardened pins 35, 36, 37, having their inner ends riding in a longitudinal slot 38 of the stem 33. The coupled shaft or stem 33 is thus rotated in unison with the sleeve 34, collet 32 and spindle Sp, but due to the slot or guideway 38, the stem 33 can move lengthwise at the same time, the pins 35, 36, 37 acting like a key.

The upper housing 20 dependently carries an intermediate housing formed of a concentric pair of tubular "telescoping" cylinders, the inner one 39 of which is fastened to the upper housing by a circle of screws 40. The outer cylinder 42 is lengthwise and rotationally slidable about the inner cylinder 39 and is formed with an upper, outward-projecting ledge 43 which is positioned for abutment with the inturned arm 44 of the L-shaped stop 30. A lower terminal ledge 45 of the outer cylinder is fastened to a lower- or gear-housing 46 by a circle of screws 47.

Within the open center 49 of the inner telescoping tube 39, an internally-threaded guide cylinder or insert 50 is removably mounted by means of a circle of screws 51 inserted jointly through a top flange 53 of the insert 50 and through an inwardly-projecting shoulder 54 of the inner tube 39. An externally threaded guide cylinder or insert 55 (having threads of the same pitch as those of the insert 50) has a lower flange 56 fastened to the top of the housing plate 57 by a circle of screws 58. Access to these last screws for a manipulating tool is by way of a corresponding circle of openings 60 in the flange 53 of the inner insert 50.

At its lower or distal extremity, the drive stem 33 traverses a bearing collar 62 and has its end fixed to a cylindrical gear wheel 63 which is thus centered within the annular chamber 64 of the gear housing 46. Slidably movable transversely (i.e., in a diametric plane) within the chamber 64 is a shift element or slide block 65, generally oval in plan view (FIG. 5) and with a flat top 52 and bottom 59 faces disposed in sliding registration with the corresponding top 96 and bottom 97 ends of the chamber 64. Fixedly projecting from the lower or distal face 59 of the block 65 and extending through the housing opening 84 (FIG. 6) is a turret 66 which houses a spindle 67 having a bored stem 68 which is journaled between lower 69 and upper 70 bearings within turret 66. A drive shaft 71 for a cutter 72 or other rotary tool is detachably held in the bore of the spindle 67 by a set screw 73. Proximately, the hub or reduced end 74 of the socketed stem 68 fixedly carries a cylindrical gear 75 which is thus paired in size and direction of rotation with the gear 63 which is from time to time directly (that is, concentrically) above it within the block 65, the gear 75 thus being retained in a lower socket or cavity of the slide block 65.

The slide block 65 is formed with an upward-opening, multi-level cavity 76 (FIG. 1), and is pivoted on a stub shaft 77 (journalled in ball bearing assemblies 78, 79) which carries an intermediate gear 83 which is equal to the axial thickness or height of both members of the pair of gears 63, 75 and engages both of them at all times so as to transmit rotary drive (in the same direction) from the stem gear 63 to the ultimate drive gear 75. However, depending upon the position of the slide block 65 which swings transversely on the shaft or axis of the intermediate gear 83, the paired gear 75 is selectively axially aligned or disaligned with its corresponding gear 63; this correspondingly aligns or disaligns the ultimate drive shaft 67 (71) with the stem 33 and driving shaft Sp. The upper gear 63, however, remains at the same location within the housing 46, regardless of shifts of the lower gear 75 by the slide block 65, but its position within the cavity of the slide block changes.

Looking at it in another way: the intermediate gear 83 has an axial height of "two units" and is retained in a corresponding cylindrical portion of the cavity 76 by the stud shaft 77. The permanently located drive gear 63 projects into an adjacent cavity area 76a (FIGS. 5 and 8) of "one unit" height but of greater lateral width than the drive gear. In shifting of the slide block 65, these two engaged gears 83 and 63 retain their positions within the housing 46, but the slide block while it embraces or contains them, also moves in relation to them and transversely carries the third engaged gear 75 which is retained in a cavity of "one unit" height in the block, which last cavity portion closely surrounds the gears. Thus, in moving, the slide block carries this lower gear 75 with it, that is, from a concentric position directly beneath the drive gear 63, to a position laterally offset or eccentric thereto—at the same time carrying the turret 66 and ultimate driven shaft 67. The transverse movement of the slide block is made possible by the lateral extent of the upper "one unit" cavity 76a, which is moved sidewise in respect to the stationary drive gear 63. A somewhat larger, oval opening 84, corresponding to the just-mentioned slide block cavity, when the latter is in concentric position, is formed in the housing end plate 81, and allows the projecting turret 66 to move sidewise in this opening with movement of the slide block (FIGS. 5—6). A cover plate 85, having a collar 86 secured to the turret by screws 48, is slidably disposed overlying this opening 84, upon movement of the turret 66 (FIG. 1).

One apical end of the slide block 65 is formed with a transverse channel or slot 87 (FIGS. 1 and 5), disposed generally parallel to the top and bottom faces of the block, and the block is also drilled to form a cylindrical opening 88 which traverses the axial thickness or height of the block. A flat-ended, cylindrical plug 89 is rotatably disposed within the channel 87 with its ends flush with the corresponding outer faces of the block 65. An elongated screw 90 is inserted through an opening 91 of the annular housing 46, with its inner end received through a tapped, diametric opening 92 of the plug 89. Adjusting screw 90 is formed with a flared head 93 bearing calibrated measurement indicia, and having an annular groove 94 surrounding its shank, which groove receives a fixed pin 95 (FIG. 5) along one side after insertion through the wall 46, thus preventing longitudinal movement of the screw. Accordingly, rotation of the screw 90 in one direction or the other, will move the threadedly-engaged plug 89 lengthwise along the screw either toward or away from the head 93, and thus slide the block 65 in the same direction while it remains sandwiched between the top 96 and bottom 97 faces of the chamber 64. As explained earlier, this locates the dependently-projecting turret 66 and cutter shaft 71 at the desired eccentric position relative to the upper shafts 33, 31.

Lock means are also provided to hold the slide block at any such selected location. A right-angled passage 98 (FIGS. 5,6,7) is formed in the end plate 81 horizontally underlying the slide block 65; two cylindrical pins 99, 100 having complementary (45°) angled, engaging end-faces 101 are housed lengthwise-slidable in the respective channel portions. A set screw 102 is located in an outer tapped section 103 of the passage, such as a socket-head screw which is readily operable by a tool (not shown). Accordingly, small rotation of the screw 102 serves to push the pin 100 lengthwise inward and this raises the mating pin 99 perpendicularly upward so as to abut or frictionally engage the underface of the slide block 65 and prevent its further movement within the chamber 64.

In the construction detailed in FIG. 10, the cylindrical pair of threaded sleeves or inserts 50, 55 shown in FIG. 1 are replaced with unthreaded inserts 104, 105 which are locked together for relative annular movement by ball-bearing raceways 106. Accordingly, the two inserts do not move axially with respect to each other. Such inserts are used for example when cutting a single groove 107 in the side of a bore, as with the key-cutter (108) of FIG. 15. Rotation of the outer cylinder 42 now serves merely to move the eccentric turret 66 and its particular cutter (108) around the bore 109 of a workpiece, but always at the same height.

The construction illustrated in FIGS. 13—14 provides a handcrank unit for rotating the lower housing (42, 46) and cutter (108) up or down (relative to the fixed upper housing 20, and consequently to a workpiece W) when using the pair of threaded inserts 50, 55 or at a constant level when using the unthreaded inserts of FIG. 10. An upper flange of the outer cylinder 42a is formed as a bevel gear 110. A rectangular mounting frame 111 is attached to the housing by a split collar 112 which is loosely retained in an annular groove 113 by a pair of screws or bolts 114. A radial shaft 115 journaled in bearings 116, 117 disposes a pinion 118 in driving engagement with the bevel gear 110. The frame 111 is retained within a rectangular yoke 119 to permit its movement axial to the shafts 33, 31 and also to furnish limit means similar to that of the abutment arm 44 of FIG. 1, the pinion shaft 115 being operated by a crank or hand wheel 120 (or with a drive motor). Without such crank assembly, the adapter head can of course be turned by manually grasping the tube 42 or the gear housing 46. However, in either case, it will be observed that the socketed lower housing (42, 46) need not be turned at a constant speed, and its direction may be reversed at will (or stopped) in its travel along the spiral path which is determined by the threads of inserts 50, 55. This does not alter the constant rotation of the carried cutter 72, 108 however. The outer face of tube 42 is provided with an encircling band of angular indicia S (FIG. 13) to indicate the arcuate distance through which the lower housing 46 (and its dependent cutter 72) is rotated.

In the construction of FIGS. 19—21, the drive stem 33 has its lower end journaled in the bearing raceway collar 62 as before, and then terminally attached to a cylindrical gear 142 which engages a laterally adjacent gear 143 which is carried on a stub shaft 144 having its upper end received in a cross bearing channel 196 of the top plate 57a of the gear housing. The pivot shaft 144 traverses bearing assemblies in a flat-faced pair of juxaposed slide plates, or links 145,146 and has its lower end fixed to a gear 147 which engages a shiftable gear 148 (similar to gear 75 of FIG. 1) which shiftable gear is carried on the reduced end 74a of the driven shaft 68a. The end 74a extends upward into a rotary bearing unit 149 of the lower link 146 while the corresponding end 150 of the drive stem 33 extends downward into a bearing unit 151 of the upper link 145. The two juxaposed link plates 145, 146 are formed with mating surfaces designed for limited rotational movement about the axis of the stub shaft 144, by reason of a downward projecting, arcuate ridge or shoulder 152 (FIG. 19) of the upper plate which seats in a corresponding groove of the lower plate. Accordingly the link plates — and their connected drive shafts 33, 67a — can be moved together or separated like the blades of a pair of scissors which are pivoted on the axis of the shaft 144; such movement serves to axially align (FIG. 20) or offset (FIG. 21) the two shafts 33, 67a (71) while their drive connection is maintained at all times through the gear train. The lower link 146 thus takes the place of the socketed lower portion of the earlier slide block 65, which journals the two gears 75, 83 of FIG. 1. The upper link 145 takes the place of the housing plate 57 which journals the two gears 63, 83 of FIG. 1. The difference is that in the FIG. 19 case, the shafts of two gears are shiftable instead of just one (74 in FIG. 1). In other words, the shaft 144 of the intermediate gear (now split into two fragments 143,147) is now made shiftable while still serving as a pivot point. Consequently the corresponding slide block (158) can be moved in a straight line instead of arcuately as was necessary with the block 65. To aid in returning the gear train to concentric drive position (FIG. 20) from offset position (FIG. 21), a tension spring 194 connects a lateral ear 195 of the upper link plate 145 with a lug 193 on the inner face of the gear housing 46a.

The bottom plate 81a of the gear housing is formed with two upward extensions 153,154 having their upper arcuate edges lodged beneath corresponding shoulders 155, 156 of the inner housing side wall and with mutually facing, inner beveled edges jointly forming a transverse or diametric channel 157 across the floor of the housing. A pair of correspondingly angled, elongated, rectangular gibs 160, 161 line the sides of the channel. The top of the turret 66a is formed with a wedge-shaped projection 158 which is shorter than and slidable lengthwise along the channel which it contacts on both sides; the wedge carries a bearing unit 159 which journals the socketed stem 68a which latter upwardly terminates in the reduced end 74a which carries the gear 148. Accordingly, as the wedge 158 is moved back and forth along the channel 157, it correspondingly locates the turret 66a along the length of the oval bottom opening 165 in the plate 81a through which the turret projects. This shifts the driven shaft 67a between axial alignment with the drive shaft Sp 33 (the position of FIG. 20) and the offset position of FIG. 21. The wedge 158 is locked in any such selected position by means of a screw 162 which is received through a bore 163 of the side housing 172 and threadedly engaged in a tapped opening 164 of the projection 154, with its inner end in frictional abutment with a ledge of the gib 161. An adjusting screw 166 has its head 171 rotatably seated in a recess 167 of the housing side wall 172 and there anchored against axial displacement by a pin 168 (FIG. 20) inserted through a vertical bore and lodged in an annular groove 173 formed around the neck of the screw. The inner end of the screw is received in a radially directed, tapped bore 170 of the sliding wedge 158, which bore is parallel to the sides of the slide channel 157.

FIGS. 22—23 show an adapter unit for positioning the driven shaft (67a) at a further offset position from the initial drive shaft (Sp 33) which adapter may thus be used in order to position a cutter to cut large diameter openings, grooves, threads, scallops, etc. The cover 85a of FIG. 19 is first removed and to the non-rotating turret 66a, there is affixed a partially open-top housing tube 175 having a top flange 176 formed with a pair of parallel slots 177, 178 disposed to receive attachment bolts or screws 179, 180 for coupling it to the underface of bottom plate 81a. Split wings 181,182 along one side of the housing are provided with transverse, threaded fasteners 183 for drawing the parts tightly together. Within the housing, a spindle 184 has its upper end fixed in the rotary socket 68a and distally carries a gear 185 with the spindle end being journaled in bearing unit 186. A parallel spindle 188 having its ends journaled in bearing units 189, 190, carries a gear 187 which is driven by gear 185 and disposes a socket 191 and set screw 192 for anchorage of the shaft of the selected cutter.

A similar adapter unit (FIG. 24) is provided for attachment to the bottom of the head of FIG. 1, upon removal of the cover plate 85. The flange plate 197 is secured to the underface of housing plate 81 by bolts 201, 202 inserted through curved slots 199, 200. These are located to allow pivoting of the flange 197 about the point 198 (before tightening the bolts 201,202) so as to accommodate to a particular offset position of the projecting turret 66.

By having the workpiece on a milling table (not shown) the table can be used to raise or lower the workpiece and thus permit cutting grooves at different heights. By use of an end mill 121 (FIG. 15), bottom grooves 122 can be cut, or with a fly cutter 123 (FIGS. 16—17) an uneven surface can be leveled or shaved, either by moving the rotating cutter in a large enough circle to sweep the workpiece, or by moving the workpiece by means of the milling table.

As further illustrative examples of usage of my milling head: The head gasket G of FIG. 18 can be formed on a milling table. With the cutting end 121 of FIG. 15, the central annulus 124 is removed and the concentric cuts a, b, c, d, are made, in each case with the driven shaft 71 disposed at a circumference of a circle based on the point 125 which corresponds to the central axis of shafts 31, 33; this is when using the pair of nonspiral guide inserts of FIG. 10 (104,105). The four cutouts 126, 127, 128 and 129 are similarly drilled or cut (depending upon their size) by radiusing the cutter from the corresponding centers. In such manner, scalloping or profiling of numerous workpieces intended for various specialized uses can be made. Straight cuts can be made simply by moving the milling table in a straight line, without arcing the cutter shaft 71. But any desired radius for a curved cut can be quickly set, simply by adjusting the offcenter position of the turret 66 by means of the slide block 65, positioning screw 90 and lock 99, 100, 102 of FIG. 1; or by setting the sliding wedge 158 of FIG. 19. However in making such cuts with an end mill 121, the spiral guide inserts 50, 55 need not be replaced by the nonspiral inserts 104,105, since a simultaneous small axial displacement of the cutter would be immaterial. For larger diameter arcs or circles, the adapters of FIGS. 22—24 are used.

Use of a thread cutter 72 with the present milling head is particularly effective in cutting interrupted threads (FIGS. 11—12) in intersecting bores 139, 140, since the vertical margin 41 of the two bores does not result in a jagged or torn edge as may be the case when using a conventional tap. Likewise, the problem of supporting such tap in threading an interrupted bore does not arise with the present cutter.

It will be apparent that the use of my pivotally linked, gear train construction for offsetting adjacent drive shaft segments is not limited to its utilization in a milling head as particularly exemplified herein. Also, the scope of the invention is to be interpreted broadly, as hereafter defined, having reference to possible substitution of functional equivalents within the ability of one skilled in the art.

I claim:

1. The combination comprising a gear train including:
a rotary drive shaft carrying a drive gear;
a rotary driven shaft carrying a driven gear;
an intermediate gear engaging both of said gears and located continuously to transmit rotary movement from the drive gear to the driven gear; and
a housing containing the three engaged gears and formed with a transverse guideway containing a movable socket member carrying at least one of said gears, and calibrated positioning means connecting said housing and socket member whereby the socket member is progressively movable along said guideway in either direction to locate all three engaged gears in selected positions of mutual alignment whereby the driven shaft may be shifted to and from offset position relative to the drive shaft without interruption of continuous rotary movement of each shaft as transmitted through said gears.

2. The combination of the preceding claim 1 wherein said socket member is associated with a pair of links, one connecting the drive gear to the intermediate gear, and the other connecting the intermediate gear to the driven gear, whereby the drive gear and driven gear may be moved arcuately toward and away from each other about the axis of said intermediate gear.

3. The combination of the preceding claim 1 wherein said socket member is movable along the guideway in a straight line by said calibrated positioning means in shifting said driven gear to and from concentric position relative to said drive gear.

4. The combination of the preceding claim 1 wherein both the driven gear and the intermediate gear are carried by said socket member and thus are both shiftable relative to the drive gear.

5. The combination of the preceding claim 1 wherein said socket member is associated with a pair of juxtaposed link plates formed with arcuate-grooved mating surfaces for scissors-like movement, one connecting the drive gear to the intermediate gear and the other connecting the intermediate gear to the driven gear, said gears and connecting links being supported within said housing and said calibrated positioning means are adapted for shifting said driven gear to and from concentric position relative to said drive gear, which shift is pivoted about the axis of said intermediate gear.

6. The combination of the preceding claim 1 which additionally includes means for selectively moving said housing and its contained gear train in a spiral path whereby a cutter carried by said driven shaft may cut threads on a workpiece.

7. The combination of the preceding claim 6 which additionally includes a pair of axially extensible telescopic tubes and a replaceable, generally concentrically positioned pair of mutually threadedly-engaging guide cylinders formed with a selected pitch adapted for correspondingly varying the pitch of said spiral path and thereby cutting threads of a selected pitch.

8. The combination of the preceding claim 7 which additionally includes a detachable adapter unit comprising laterally disposed spindle and gear means functionally engageable by said driven gear.

9. The combination of the preceding claim 1 wherein said housing and its contained gear train is selectively rotatable at will in either direction, whereby an arcuate or annular cut may be made in a workpiece with a milling cutter carried by the driven shaft located in offset position to the drive shaft.

10. The combination of the preceding claim 1 wherein at least two of the gears of said gear train are carried by said socket member which is slidably mounted in said transverse guideway formed within said housing, and said calibrated positioning means is adapted for moving said slide block along the guideway, including means for locking same at selected points therealong.

11. A milling head component of the character described, comprising in combination:
a stationary housing adapted to receive a rotary drive shaft therein;
a rotatable housing axially spaced from said stationary housing and carrying a driven shaft adapted to dispose a cutting element at its distal end;

telescopic means connecting the stationary housing and the rotatable housing for individual or joint, rotational and axial movement of the rotatable housing, including a pair of mutually rotatably engaging, cylindrical guide sleeves, respectively supported by the stationary housing and the rotatable housing, and thus adapted by their relative rotation to determine the movement of the rotatable housing relative to the stationary housing;

a rotary drive stem having one end adapted to be functionally coupled to said drive shaft by means allowing its progressive axial displacement upon axial movement of said rotatable housing and having its distal end journalled in said rotatable housing; and coupling means carried by said rotatable housing functionally connecting said distal end of the drive stem with said driven shaft and including transversely extensible and retractable gear means adapted to functionally position said driven shaft at selected offset positions from said drive stem.

12. The milling head component of the preceding claim 11 wherein said coupling means comprise a gear train consisting of a drive gear carried by said drive stem, a driven gear carried by said driven shaft, and an intermediate gear engaging both of said gears and located continuously to transmit rotary movement from the drive gear to the driven gear, and a pair of links, one connecting the drive gear to the intermediate gear and the other connecting the intermediate gear to the driven gear, said component having guide means for shifting said driven gear to selected offset positions relative to said drive gear, which shift is pivoted about the axis of said intermediate gear.

13. The milling head component of the preceding claim 11 wherein at least two of the gears of said gear train are journalled within a slide block which is slidably disposed in a guideway formed within said rotatable housing, which rotatable housing also carries calibrated locating means for moving said slide block along the guideway, including means for locking same at selected positions therealong.

14. The milling head component of the preceding claim 11 wherein said telescopic means comprise a pair of tubular cylinders disposed in axially sliding registration with each other concentric to said guide sleeves, which guide sleeves are threadedly engageable with each other and hence upon rotation are adapted to direct the cutting element in a spiral path.

UNITED STATES PATENT OFFICE
CERTIFICATE OF CORRECTION

Patent No. 3,526,167          Dated September 1, 1970

Inventor(s)    Francisco Escobedo

It is certified that error appears in the above-identified patent and that said Letters Patent are hereby corrected as shown below:

Column 10, line 10, "of the gears of said gear train" should read -- gears of said gear means --.

Signed and sealed this 1st day of June 1971.

(SEAL)
Attest:

EDWARD M. FLETCHER, JR.
Attesting Officer

WILLIAM E. SCHUYLER, JR.
Commissioner of Patents